United States Patent Office 3,536,616
Patented Oct. 27, 1970

3,536,616
METHOD FOR REMOVAL OF OILS FLOATING ON SURFACE OF WATER
Goro Kondoh, Nishinomiya-shi, and Sigeru Honda and Yukio Murakami, Osaka, Japan, assignors to Agency of Industrial Science & Technology, Tokyo, Japan, a quasi-governmental agency
No Drawing. Filed June 20, 1968, Ser. No. 738,396
Claims priority, application Japan, June 24, 1967, 42/40,356
Int. Cl. C02b 9/02
U.S. Cl. 210—40          5 Claims

ABSTRACT OF THE DISCLOSURE

This invention relates to a method of removing oils floating on the surface of water which comprises spraying a solution of a synthetic polymer dissolved in a low-boiling point organic solvent over the oil floating in thin film form on the surface of water, thereby forming a thin film or fine droplets of said solution on the surface, allowing the floating oil to adhere to said thin film or fine droplets, and collecting these by an appropriate means.

BACKGROUND OF THE INVENTION

This invention relates to a method of removing oils floating in thin film form on the surface of water.

Recently, due to the frequent occurrence of marine accidents involving the wreckage of tankers, the breakage of oil pipes, etc., there has been an increase in the number of accidents in which heavy oils, crude oils and the like flow out on the surface of the sea.

Heretofore, the method for removal of oil in such cases has been to first remove by suction the oil which has floated off and thereafter spray a surface active agent to emulsify and disperse the remaining oil or spray a solvent of high specific gravity to precipitate said oil.

However, if the floating oil is spread out in extremely thin film form over a wide surface area of the water, it is questionable economy to use the above-mentioned dispersant or precipitant. Moreover, such oil in thin film form adheres to the spores of marine products, to prevent the germination thereof, and this has become one of the hazards to sea life.

The object of this invention is to provide a method of removing oils floating on the surface of water, particularly the oil floating in thin film form, completely and easily by using a thin film or fine droplets of a low-priced synthetic polymer.

DESCRIPTION OF THE PREFERRED EMBODIMENT

In view of the above, the present inventors conducted research and, in consequence, discovered a method of removing oils floating on the surface of water easily and completely by forming a thin film or fine droplets of a low-priced synthetic polymer on the surface of the water on which oil is floating, allowing the oil to adhere to said thin film or fine droplets and thereafter collecting these.

Also, the adherence of oil to a thin film of fine droplets of a synthetic polymer was thought to be greatly influenced by the contact angle of said polymer to the water and the oil, and, therefore, the contact angle of thin films of various polymers to water and oils was measured to obtain the results as shown in Table 1 below. (For an explanation of the meaning of the expression "contact angle" see, A. E. Alexander Surface Chemistry, p. 55, 1951 ed., Longmans, Green and Co.)

The heavy oils B and C in this specification are so classified according to viscosity, the former denoting a heavy oil having a viscosity within the range of 20–50 cst. at 50° C. and the latter a heavy oil having a viscosity within the range of 50–400 cst.

TABLE 1.—CONTACT ANGLE IN DEGREES

|  | Water | Fluid paraffin | Heavy oil B | Heavy oil C | Crude oil |
|---|---|---|---|---|---|
| Polyester | 74 | 5 | 0 | 0 | 0 |
| Non-plasticized vinyl chloride | 78 | 6 | 29 | 39 | 26 |
| Vinyl chloride (plasticizer contained) | 80 | 9 | 0 | 12 | 0 |
| Polystyrene | 90 | 3 | 0 | 10 | 0 |
| Polypropylene | 85 | 18 | 16 | 25 | 15 |
| Polyethylene polymerized under low pressure | 84 | 16 | 30 | 32 | 30 |
| Polyethylene polymerized under high pressure | 89 | 12 | 0 | 22 | 0 |
| Paraffine paper | 92 | 30 | 20 | 42 | 25 |
| Polyurethane | 69 | 21 | 17 | 28 | 15 |

Remarks: Measuring temperature. 20° C.; Unit of numerical value, degree.

Theoretically, synthetic polymers having a wide angle of contact with water and a small angle of contact with oil should be suitable; in this sense, from the above table, polyester, vinyl chloride, polystyrene, and polyethylene polymerized under high pressure are thought effective, but in view of organic solvent required to dissolve the synthetic polymer and cost of polymers, polyethylene is most effective among them.

On the other hand, thin films of the above-mentioned various polymers were dipped in water, fluid paraffin, heavy oil B, heavy oil C and crude oil, respectively, which were then shaken off for one minute by a 2000 r.p.m. centrifuge, and thereafter the weight of the respective thin film was measured, with the result that it was confirmed that, regardless of the kinds of polymers, the weight of the thin film increased as shown in Table 2.

TABLE 2

| Solution in which dipped: | Increase in weight (mg./cm.²) |
|---|---|
| Water | 0.18–0.22 |
| Heavy oil B | 0.4–0.5 |
| Heavy oil C | 4.0–5.0 |
| Crude oil | 0.9 |

As is clear from the above table, it was confirmed that the higher the viscosity of the oil matter, the larger the amount thereof which adhered.

In general, for example, floating oil, because they are floating on the surface of the sea for a long time, are mostly free from the components of low volatility which have vaporized completely, and, accordingly, have a viscosity which is substantially close to that of heavy oil C. Therefore, the method of this invention is most suitable for removing such types of floating oils.

Now, as means of spreading a thin film of a polymer over the surface of the water, the means of preparing a thin film in advance and spreading it, the spreading operation and the like, cannot in any possibility be said to be practicable. Thereupon, the present inventors adopted the means of making the polymer into a solution and spraying it over the surface of the water to form thereon a thin film or fine droplets of said solution.

That is to say, if a polymer is dissolved in advance in a low-boiling point organic solvent such as hydrocarbon, halogenated hydrocarbon or the like and the resulting solution is sprayed over the surface of the water by using a sprayer, then the solution spreads well and, at the same time, the organic solvent vaporizes, with the result that a thin film of the polymer is formed. In this case, it is desirable that the thin film formed be in the form of fine droplets rather than in continuous thin layer form.

As a low-boiling point organic solvent used in this invention, when considered from poisonous property, volatility and cost thereof, toluene and the mixed solution of n-hexane-chloromethylene are effective. Namely, the employing toluene at high atmospheric-temperature and the using of the mixed solution of n-hexane-chloromethylene at low atmospheric-temperature respectively will give good results.

As the relative proportions of the polymer to the organic solvent, about 5–15% (by weight) is desirable and, accordingly, when the concentration is over 15% (by weight), the solution will become tenacious and making it difficult to spray, while, when the concentration is under 5% (by weight), the spraying volume of the polymer will become less and reducing a collecting effect. Incidentally, when 2–3% of a surface active agent having a low HLB like trioleate is added to the sprayer solution, the spreading of the solution on the surface of the water is promoted. The solvent action is not promoted.

When a solution of a polymer is sprayed, a thin film or fine droplets thereof are formed and float on the surface of the water to absorb the floating oil, so it is possible, by collecting said thin film or fine droplets to which the oil has adhered, to remove the oil effectively.

A preferred example is illustrative of this invention, and it will be understood that the invention is not limited thereto.

EXAMPLE 1

Polystyrene pellets (50 g.) were dissolved in 500 cc. of toluene, followed by the addition of about 2 g. of trioleate to make a spray solution. On the other hand, about 20 g. of heavy oil C was mixed by stirring with water the surface area of which was 4 m.², and was allowed to spread over the surface of water. The above-mentioned spray solution was then uniformly sprayed over the surface of water by a spray gun. The droplets of said solution so sprayed spread well and, at the same time, the toluene vaporized, with the result that a thin film and fine droplets of the polystyrene were formed and the heavy oil adhered thereto. The thin film and fine droplets of the polystyrene to which the heavy oil adhered were then collected by using a net. In this way the heavy oil which floated on the surface of water was completely removed.

EXAMPLE 2

Polystyrene pellets (50 g.) were dissolved in 500 cc. of mixed solvent comprising equivalent volume of n-hexane-chloromethylene to make a spray solution. The above-mentioned spray solution was then sprayed by a spray gun on the surface of the water on which oil was floating under the same condition as Example 1. Said solution, so sprayed, formed fine droplets of the polystyrene on the surface of the water, whereby oil floating thereon were effectively collected.

What is claimed is:

1. A method of removing oils floating on the surface of water, comprising the steps of: dissolving a synthetic substantially water free polymer having appropriate water and oil contact characteristics into a single low boiling point organic solvent, spraying this polymer and solvent solution over the surface of water so as to form a polymeric thin film or fine polymeric droplets on the water surface so as to make the floating oil adhere thereto, and, finally sweeping the adhering oil polymer out of the water.

2. The method of claim 1 wherein the ratio of polymer to solvent is about 50 g. of polymer to about 500 cc. of solvent.

3. The method of claim 1 wherein the polymer is polystyrene pellets.

4. The method of claim 1 wherein the solvent is toluene.

5. The method of claim 1 wherein the solvent is a mixed solution of n-hexane-chloromethylene.

References Cited

UNITED STATES PATENTS

| 3,109,750 | 11/1963 | Roche | 117—104 X |
| 3,265,616 | 8/1966 | Wyllie et al. | 210—39 |
| 3,147,216 | 9/1964 | Oemler | 210—40 |
| 3,382,170 | 5/1968 | Pape | 210—40 X |

FOREIGN PATENTS

| 666,990 | 7/1965 | Belgium. |

MICHAEL E. ROGERS, Primary Examiner